United States Patent [19]

Kempter et al.

[11] 4,315,840

[45] Feb. 16, 1982

[54] PREPARATION OF CATHODIC ELECTROCOATING BINDERS

[75] Inventors: Fritz E. Kempter, Mannheim; Eberhard Schupp, Schwetzingen; Erich Gulbins, Heidelberg-Neuenheim, all of Fed. Rep. of Germany

[73] Assignee: BASF Aktiengesellschaft, Fed. Rep. of Germany

[21] Appl. No.: 85,965

[22] Filed: Oct. 18, 1979

[30] Foreign Application Priority Data

Oct. 23, 1978 [DE] Fed. Rep. of Germany ....... 2845988

[51] Int. Cl.$^3$ ...................... C08G 18/80; C08G 18/48; C08L 91/00; C08J 3/04
[52] U.S. Cl. ...................... 260/18 TN; 260/29.2 TN; 204/181 C; 528/45
[58] Field of Search ................. 260/29.2 TN; 528/45, 528/1; 204/181 C

[56] References Cited

U.S. PATENT DOCUMENTS 3,391,097 7/1968 Williamson .
3,947,338 3/1976 Jerabek et al. .............. 260/29.2 TN
3,947,339 3/1976 Jerabek et al. .............. 260/29.2 TN

FOREIGN PATENT DOCUMENTS 2603666 8/1976 Fed. Rep. of Germany .
1302328 1/1973 United Kingdom .

OTHER PUBLICATIONS

Condensed Chemical Dictionary, 5th Ed. (Reinhold, N.Y.) 1956, p. 228.
Baked Polyurea Coatings by George A. Hudson et al., Official Digest, Feb. 1960, pp. 213-221.

*Primary Examiner*—H. S. Cockeram
*Attorney, Agent, or Firm*—Keil & Witherspoon

[57] ABSTRACT

A process for the preparation of self-crosslinking, cathodic electrocoating binders by reacting polyether-polyols, which may or may not contain thio groups, with semi-blocked diisocyanates or partially blocked polyisocyanates, wherein the reaction products (A), containing blocked isocyanate groups, are reacted with a polyamine (B), some of whose amino groups may or may not be in the form of ketimine groups, in such a way that one or more amino groups of the polyamine (B) form a urea group with a blocked isocyanate group of the reaction product (A), and the self-cross-linking reaction product of (A) and (B) is converted into a water-dilutable form in the conventional manner by protonization with an acid.

The coating binders prepared according to the invention may be used for cathodic electrocoating of metal articles.

21 Claims, No Drawings

PREPARATION OF CATHODIC ELECTROCOATING BINDERS

The present invention relates to a novel process for the preparation of self-crosslinking cathodic electrocoating binders by reacting polyether-polyols, containing blocked isocyanate groups, with polyamines, and protonization with acids.

Surface-coating compositions which are cured by reaction of blocked isocyanate groups with amino groups have long been known.

Another coating composition for cathodic electrocoating is disclosed in British Pat. No. 1,302,328.

Cationic binders intended for electrocoating and at least partially based on this type of crosslinking are described, for example, in German Published Application DAS 2,252,536 and in German Laid-Open Applications DOS 2,265,195, DOS 2,603,666, DOS 2,541,234 and DOS 2,715,259.

A feature common to all the products which can be prepared in accordance with the publications mentioned is that tert.-amino groups are present in the cationic binder or in the coating baths prepared from these binders, as a consequence of the process of preparation which is common to all of them and is based on the reaction of an epoxide group with an amino group

where $R^1$ is H or alkyl.

It is an object of the present invention to provide an advantageous process for the preparation of cathodic electrocoating binders which give coatings having very good properties.

The present invention relates to a process for the preparation of self-crosslinking, cathodic electrocoating binders by reacting polyether-polyols, which may or may not contain thio groups, with semi-blocked diisocyanates or partially blocked polyisocyanates, wherein the reaction products (A), containing blocked isocyanate groups, are reacted with a polyamine (B), some of whose amino groups may or may not be in the form of ketimine groups, in such a way that one or more amino groups of the polyamine (B) form a urea group with a blocked isocyanate group of the reaction product (A), and the self-crosslinking reaction product of (A) and (B) is converted into a water-dilutable form in the conventional manner by protonization with an acid. The groups capable of crosslinking contained in the binders according to the invention are blocked urethane groups, secondary and/or primary amino groups, and the urea groups formed in the process of preparation according to the invention.

In contrast to the prior art processes, the process according to the invention makes it possible to obtain products whose cationic character is exclusively attributable to primary or secondary amino groups.

We have found, surprisingly, in carrying out this novel process of preparation, that the reaction is very simple to perform at reaction temperatures of from 50° to 120° C., which are unexpectedly low for the reactants, namely blocked isocyanate groups and amino groups, even if none of the conventional reaction catalysts is present and if a primary alcohol with a normally relatively high unblocking temperature is used as the blocking agent.

This achieves an essential object, namely that the reaction involved in the process can be controlled to give the self-crosslinking binders according to the invention.

A further advantage of the binders prepared by the process according to the invention is that they show high functionality in respect of the blocked isocyanate groups and amino groups. A further advantage is the multitude of possible ways of modifying and combining the components (A) and (B).

As already stated, the need to incorporate tertiary nitrogen does not apply to the binders prepared by the process according to the invention, i.e. all basic, i.e. cationic, groups are potentially amenable to crosslinking and on crosslinking lose their basic character.

The process according to the invention for the preparation of cationic electrocoating binders is based on the reaction between blocked isocyanate groups and secondary and/or primary amino groups. Accordingly, it is based on the same principle as the desired crosslinking reaction for curing the coating on the substrates. The possibility of utilizing the crosslinking reaction to prepare the cationic binders is surprising inasmuch as, for example, German Published Application DAS 2,252,536 (column 6, paragraph 3) expressly points out that in the reaction described there the blocked isocyanate groups should be preserved.

The binders are in general prepared at from 50° to 140° C., preferably from 70° to 120° C. During the reaction of the amino groups and the blocked isocyanate groups, taking place with formation of urea bridges, the blocking agent is split off and remains as a solvent in the reaction mixture or is removed if its volatility permits this or if the reaction is carried out under reduced pressure; the latter is entirely feasible and gives solvent-free reaction products. The crosslinking reaction takes place at a sufficient speed at from 160° to 200° C., preferably from 170° to 180° C. The separation of the reaction in which the binder is prepared from the crosslinking reaction can be additionally assisted by other technical and chemical measures, for example (a) by lowering the reaction temperature when the desired degree of conversion has been reached—in general identifiable by the attainment of a particular viscosity, or (b) by protonization with acids and dilution with solvents, e.g. water. The measures referred to under (a) and (b) can also be combined with one another. The chemical measures include the possibility of employing polyamines which are partially blocked by ketimine groups, or of blocking remaining amino groups in the molecule, after the preparation of the binder, by means of ketones to give ketimine groups, the blocking being a temporary measure which is reversed later, when water is present.

From a technical point of view, the preparation of the binder and the crosslinking reaction are sharply separate. The first is characterized by, for example, the fact that the binder is water-dispersible and that, when deposited as a coating, it possesses levelling characteristics. The crosslinking of the binder, on the other hand, leads to solvent resistance (especially toward acetone) and to mechanical strength and corrosion-protection characteristics of the coating on a great variety of substrates, eg. treated and untreated steel.

The various substrate pretreatment processes can have a certain influence on the said characteristics, and their effectiveness often depends on the degree of crosslinking of the coatings. The resin-forming reaction preferably takes place at 70°–120° C. The reaction in general manifests itself in an increase in viscosity of the reaction mixture. When using polyamines of high functionality, the characteristic rise in viscosity is closely comparable with the progress of the reaction, since the viscosity curve shows a less curved, almost linear shape for the reaction of the 1st amino group of the polyamine; as further amino groups of the polyamine react, the viscosity rises markedly more rapidly, and the curve is of about exponential shape. In general, the binders have already reached good technological characteristics, for example the requisite water-dispersibility, electrical breakdown strength or levelling characteristics, at the transition from the linear to the approximately exponential increase in viscosity. It can however be very desirable to continue the reaction and to terminate it when a particular higher degree of condensation has been reached. This, for example, increases the compatibility with neutral binders which may have to be added for one reason or another, and also improves the electrical breakdown strength and reduces the residual current density.

Ultimately, however, the rise in viscosity depends on the number of reacting groups. For example, at a given temperature, eg. in the range from 70° to 110° C., the viscosity increase, even as the reaction progresses, can be slowed down if the number of blocked isocyanate groups or amino groups is deliberately reduced.

Since the built-in blocking agents are needed during the resin-forming reaction and the crosslinking reaction, it can be very advantageous to employ blocking agents which are especially suitable for the particular reaction step. For example, different blocking agents may be used for the resin-forming reaction and for the crosslinking reaction, each blocking agent being more appropriate for the conditions of the particular reaction step.

Blocking agents which are particularly effective in ensuring that the reaction according to the invention, giving the cathodic binders, takes place are etheralcohols, eg. ethylglycol and 1-methoxypropan-2-ol, though oximes and phenols, which deblock at low temperatures, are also suitable blocking agents. On deblocking, partial elmination of polyether-polyol, and hence transfer of the blocked isocyanate to the polyamine (B), can also take place. In order to prevent this side-reaction, it is particularly advantageous to employ a proportion of the blocking agents which deblock at low temperatures, eg. phenols, phthalimide, imidazole and/or ketoximes.

Since, in preparing the reaction product of (A) and (B), these blocking agents are, on the one hand, split off preferentially and, on the other hand, are an undesirable constituent in the coating baths, because of their physiological properties, they can be converted into physiologically harmless, solvent-like or plasticizer-like compounds by reaction with epoxide compounds, such as monoepoxides, eg. ethylene oxide or propylene oxide, or polyepoxides.

It is true that this presupposes that the amino groups of the polyamine (B) are in part protected by ketimine groups against reaction with the epoxide compounds. If mixtures of blocking agents are used for the resin-forming reaction, the reaction times and/or reaction temperatures can of course be varied as desired. This situation also applies as regards the substances which catalyze the desired reaction, eg. the acetates, naphthenates and oleates of tin, lead, zinc, zirconium, cobalt, nickel and copper.

As regards the individual starting materials for the process of preparation according to the invention, the following should be noted:

(A) For the purposes of the invention, "reaction product A" means, quite generally, reaction products, containing blocked isocyanate groups, obtained from polyether-polyols, which may or may not contain thio groups, and from partially blocked polyfunctional isocyanates.

The polyether-polyols employed for the above purpose may be selected from a great variety of categories of starting materials. In principle, the ether groups —O— may in part be replaced by other hetero-atoms

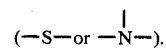

The thioether group (—S—) is a very suitable group of this type. Polyether-polyols for use according to the invention are easily obtainable by complete reaction of the epoxide groups of aromatic and aliphatic epoxide compounds, which may already contain alcoholic OH groups, with suitable substances of the general formula HXR, where X is —O—, —S—, [—O—CH$_2$—CH$_2$—]$_n$ or

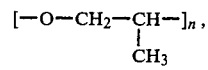

n is an integer from 1 to 3 and R is alkyl of 1 to 12, preferably of 1 to 10, carbon atoms, or is —CH$_2$—CH$_2$—OH or

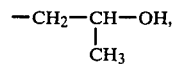

eg. alcohols, mercaptoalkanols and glycols which provide the required functionality of (primary or secondary) alcoholic OH groups which is the critical factor in properly carrying out the process of preparation according to the invention.

The reaction with glycol and oligomeric glycolalcohols is preferably carried out in the presence of a suitable catalyst, for example boron trifluoride etherate, using an excess of the alcohol. The excess alcohol is removed by distillation under reduced pressure prior to the reaction with the partially blocked polyisocyanate. In principle, any reaction which ensures the opening of the ring of the epoxide under simple conditions may be used. The conversion of small residual amounts of epoxide, toward the end of the reaction, sometimes presents difficulties, especially if the ring-opening reaction is to be carried out with a predetermined ratio of the number of equivalents of the reactants. However, these residual amounts can be removed in a simple manner by using BF$_3$ catalysts, the epoxide group reacting with OH groups present.

Examples of suitable epoxide compounds for the above purpose are polyepoxides with 2–3 epoxide groups in the molecule, for example reaction products of polyhydric phenols, especially of phenols of the formula

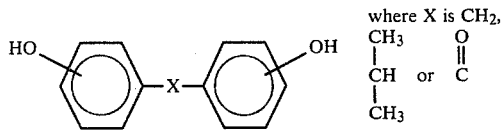 where X is CH$_2$,
$$\begin{array}{ccc} CH_3 & & O \\ | & & \| \\ CH & \text{or} & C \\ | & & \\ CH_3 & & \end{array}$$

with epichlorohydrin. Other examples of phenols are bis-(4-hydroxy-tert.-butylphenyl)-2,2-propane, bis-(2-hydroxy-naphthyl)-methane and 1,5-dihydroxynaphthalene, and "dimers" and phenol-adducts of cardanol. However, the above reaction products of polyhydric alcohols, eg. pentaerythritol, trimethylolpropane or glycerol, with epichlorohydrin are also suitable. Other suitable epoxide compounds are epoxidized polybutadiene oils, epoxy resins obtained from 1,1-methylene-bis-(5-substituted)-hydantoin, as described in U.S. Pat. No. 3,391,097, diepoxides obtained from bis-imides, as described in U.S. Pat. No. 3,450,711, and 1,3,5-triglycidyl isocyanurates.

Other very suitable polyether-polyols are the reaction products of epoxide compounds with polyphenols, ie. polyether-phenols, which can subsequently be converted to polyether-polyols by removing the phenol end groups by means of monoepoxide compounds, eg. ethylene oxide or propylene oxide. It can at times be advantageous to carry out this oxyethylation or oxypropylation with an excess of the monoepoxide compound in order also to convert a part of the alcoholic OH groups. If the polyether-phenols are methylolated with formaldehyde prior to the reaction with monoepoxide compounds, polyether-polyols which additionally contain benzyl alcohol groups are obtained.

The above polyether-phenols can of course also be prepared by the conventional methods from epichlorohydrin and appropriate amounts of polyphenol.

If diepoxide or polyepoxide compounds are reacted with a less than equivalent amount (based on phenolic OH groups) of polyphenols, epoxy resins of higher molecular weight are obtained; these may prove very suitable starting materials for the purposes of the invention, particularly since they possess, in contrast to the commercial products, a degree of crosslinking, resulting from side-reaction with alcoholic OH groups, which can be influenced according to requirements.

Other suitable polyether-polyols can be prepared from polyphenols, eg. from novolacs, by oxyethylation or oxypropylation.

Another category of useful polyether-polyols is obtained by reacting trihydric, tetrahydric, pentahydric or hexahydric alcohols, eg. trimethylolpropane, pentaerythritol, dipentaerythritol, sorbitol and the like, with ethylene oxide and/or propylene oxide, the ratio of alcohol to monoepoxide used depending on the desired molecular weight range of the polyether-polyol.

Possible methods of modifying the polyether-polyols include partial esterification with unsaturated fatty acids, eg. fatty acids from linseed oil, tall oil, castor oil, oiticica oil and the like. Similar modified polyether-polyols may also be prepared by completely or partially reacting the epoxide groups of polyether-epoxides, for example of glycidyl ethers of diphenylolpropane, with the said fatty acids. Under the conditions of the reaction in which resin is formed from reaction product (A) and polyamine (B), there will also occur partial or complete transfer of the fatty acid radicals, by aminolysis, to the polyamine (B), which may be present as such or may already have reacted. This is particularly true of the 2nd category of possible modifications, involving the epoxide-esters.

A further possible method of modification is by reacting the epoxy resin with Cardanol, a phenol derivative bearing an olefinically unsaturated organic radical. Cardanol is the monohydric phenol fraction of cashew nut shell liquid. This phenol has a 15-carbon unsaturated, meta-substituted group. It is in general a mixture of long-chain 3-alkenylphenols with from about 13 to 17 carbon atoms in the alkenyl radical, eg. 3-(8,11-pentadecadienyl)-phenol. In this reaction, Cardanol is irreversibly incorporated into the material via phenyl-ether groups.

Following their preparation, the polyetherpolyols, which may or may not contain thio groups, are reacted with semi-blocked diisocyanates or partially blocked polyisocyanates, to form the reaction product (A), containing blocked isocyanate groups. A corresponding process, starting from epoxy resins, is described in German Laid-Open Application DOS 2,711,425. Amongst suitable isocyanates, those where partial blocking or semi-blocking takes place particularly selectively are preferred. They include toluylene diisocyanates and isophorone diisocyanate. Suitable blocking agents are the conventional primary, secondary and tertiary alcohols, eg. n-, iso- and tert.-butanol, 2-ethylhexanol, ethylene glycol monoethyl ether, monoalkyl ethers of polyglycols, oligomeric adducts of ethylene oxide or propylene oxide with alkanols, cyclohexanol and other blocking agents, for example those mentioned above. It has proved particularly advantageous to employ mixtures of two blocking agents, these blocking agents each being selected so as to be particularly suitable either for the resin-forming reaction or for the crosslinking reaction.

Two substances of this type are, for example, ethylglycol and 2-ethylhexanol. The ratio of the blocking agents can be selected so that within a defined temperature range, in the 1st stage of the reaction, a defined number of amino groups are reacted. The reaction of the partially blocked isocyanates with the polythiopolyols is carried out in the conventional manner, in the presence or absence of a solvent which is inert toward the reactive groups of the reaction product (A) and of the polyamine (B), at from 60° to 130° C. The alcoholic OH groups of the polyether-polyol are in most cases converted to urethane groups to the maximum readily achievable degree. The reaction times are somewhat longer. To achieve this complete conversion, it can be useful to employ a higher temperature toward the end of the reaction, or to employ one of the conventional catalysts, for example dibutyl-tin dilaurate. The end point of the reaction is discernible from the viscosity of the batch becoming constant, but can also be determined by titration of the isocyanate groups. In general, the reaction is stopped when isocyanate contents of from 0.15 to 0.5 percent by weight, based on the total amount of the reaction product (A), are reached.

(B) For the purposes of the invention, polyamine (B) means, quite generally, amines with 2–20 primary and/or secondary amino groups in the molecule. These amino groups may be part of an aliphatic and/or cycloaliphatic molecule.

In addition to these characteristic groups, the polyamines may contain other groups which are important for achieving certain product characteristics, for example HO—, —O—, —CH=CH—,

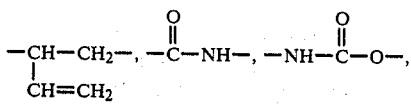

amide-bonded unsaturated fatty acid radicals or dimeric fatty acid radicals. Suitable polyamines (B) also include reaction products of the cardanol/epichlorohydrin adduct with polyamines.

Specific examples of polyamines (B) are the following: diethylenetriamine, dipropylenetriamine, N,N'-bis-(3-aminopropyl)-ethylenediamine, bis-(6-aminohexyl)-amine, tripropylenetetramine, tetrapropylenepentamine, pentaethylenehexamine, hexamethyleneheptamine and the like, 4,4'-diaminodicyclohexylmethane and its derivatives, for example its reaction products with epoxide compounds, eg. the diglycidyl ethers of bisphenol A, already referred to, or, more generally, polyglycidyl ethers of polyphenols and polyhydric alcohols. Products which in part are similar have long been known and are described, for example, in U.S. Pat. Nos. 2,772,248 and 2,909,448. The reaction is preferably carried out in such a way that the amino group which has reacted retains an NH group.

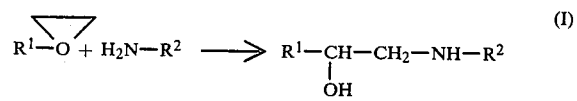

where $R^2$ is a polyamine radical. Reaction conditions for achieving this can be ensured, in a simple manner, if at all stages of the reaction a large excess of amine is present; the reaction may be carried out in the presence or absence of an inert solvent. The excess amine is subsequently removed by distillation.

In a particularly preferred embodiment of the process according to the invention, polyamines (B) based on reaction products of polyphenols and epichlorohydrin, especially bisphenol A, are reacted with aliphatic polyether-polyol derivatives containing blocked isocyanate groups (ie. with reaction product (A)); the amount of

present in the molecule of component (B) should be from 15 to 50% by weight, based on the sum of (A) and (B).

Other suitable epoxide compounds for preparing suitable polyamines in accordance with reaction (I) are the glycidyl ethers of cardanol (see above), and the diglycidyl ether of the adduct of phenol with cardanol.

Other suitable polyamines are the products, preferably of molecular weight 500–5,000, obtained by hydrogenation of butadiene/acrylonitrile copolymers. Yet other suitable polyamines are polyethyleneimines and polypropyleneimines, as well as polyaminoimidazolines and polyaminoamides of saturated or unsaturated (dimeric) fatty acids, of dicarboxylic acids or of tricarboxylic acids.

Polyamines (B) containing 4–15 primary and/or secondary amino groups are particularly suitable for the process of preparation according to the invention. The products may have molecular weights of 100–5,000, preferably 150–1,500.

The reaction product (A) is in general reacted with the polyamine (B) in a weight ratio of from 9:1 to 2.5:7.5, preferably from 8.5:1.5 to 4:6.

The binders prepared by the process according to the invention may be diluted with conventional surfacecoating solvents, such as $C_3$–$C_{16}$-alcohols, eg. isopropanol, decanol, n-butanol and iso-butanol, alkylaromatics, eg. toluene and cycloaliphatics, (oligomeric) glycols and glycol-ethers or aqueous organic solvent mixtures and may then be applied, with or without incorporation of pigments, fillers and conventional assistants, onto the substrate to be coated or finished, for example wood, metal, glass or ceramic, by conventional surface-coating methods, eg. spraying, dipping or flooding; thereafter the coating is dried, and is cured at above 170° C. The coatings thus obtained are distinguished by, for example, great hardness and great resistance to solvents.

Preferably, however, the surface-coating binders prepared by the process according to the invention are used in a protonized form obtained by reaction with acids, eg. phosphoric acid and its derivatives or, preferably, water-soluble carboxylic acids, eg. acetic acid, formic acid or lactic acid. The protonized surface-coating binder can be diluted with water and can be used by the above conventional surface-coating methods, again giving coatings having very valuable properties. However, the degree of protonization should be kept as low as possible.

The preferred use of the protonized surface-coating binders prepared by the process according to the invention is the cathodic electrocoating of electrically conductive surfaces, for example surfaces of metal articles and sheets made from brass, copper, aluminum, iron or steel, which may or may not have been chemically pretreated, eg. phosphatized.

The aqueous solutions or dispersions of the surface-coating binder, which is at least partially in the form of a salt of a water-soluble carboxylic acid, can also contain assistants which can be electrochemically deposited by cataphoresis when present in a mixture with the said binders, such as pigments, soluble dyes, solvents, flow improvers, stabilizers, curing catalysts, anti-foam agents and other assistants and additives.

The surface-coating binders prepared by the process according to the invention may be used both as the main carrier resin for electrocoating and as the mill base for the pigment paste. In the case of such dual use, the Cardanol-modified and fatty acid-modified binders obtained by the above process of preparation are particularly suitable. Alternatively, the resin can be used as the main carrier resin for the electrocoating composition, in combination with a conventional pigment paste (for example obtained as described in German Laid-Open Application DOS 2,606,831).

For cathodic electrocoating, the solids content of the bath is in general brought to 5–30 percent by weight by dilution with deionized water. In general, the coating is carried out at from 15° to 40° C. for from 1 to 2 minutes at a bath pH of from 5.0 to 10.2, preferably from 6.0 to 8.5, with deposition voltages of from 50 to 500 volt.

After rinsing off any adhering bath liquor, the film which has been cathodically deposited on the electrically conductive article is cured for from 10 to 30 minutes at from about 160° to 220° C., preferably for 20 minutes at from 170° to 180° C.

The coating agents according to the invention, when used for cathodic electrocoating, give coatings having excellent mechanical properties, such as great hardness and scratch resistance coupled with very good resilience and firm adhesion to the substrate.

Further, the coatings obtained exhibit high resistance to solvents and high corrosion resistance, for example in a salt spray test.

In the Examples, parts and percentages are by weight, unless stated otherwise.

EXAMPLE 1

55.0 parts of freshly distilled mercaptoethanol are added dropwise in the course of 30 minutes, at 60°–90° C., to 250.0 parts of a diglycidyl ether, obtained from bisphenol A and epichlorohydrin and having an epoxide value of 0.2, dissolved in 63.0 parts of toluene; the mixture is then kept at 110° C. for 90 minutes, after which the solvent, and the excess mercaptoethanol, are removed under reduced pressure from a waterpump; toward the end of this process, the temperature rises to 120° C. The residue is then diluted with 193.0 parts of toluene.

390.5 parts of a semi-blocked isocyanate obtained from 696.0 parts of toluylene diisocyanate (an 80/20 mixture of the isomers) and 360.6 parts of ethylglycol are added dropwise in the course of one hour, at 80° C., to the polythioether-ol prepared as described above. The batch is then stirred for a further 7.5 hours at 80° C., after which it is diluted with 112.0 parts of toluene. The product, which constitutes component A, has a solids content of 72.0%.

200.0 parts of component (A), containing blocked isocyanate groups, and 70.0 parts of a polyaminoimidazoline obtained from a dimeric fatty acid and polyamines, and having an amine number of 370–410 (eg. Versamid ® 140 of Schering AG) and 14.0 parts of a monoalkanol of 12 to 14 carbon atoms are reacted for 75 minutes at 100° C. and the mixture is then cooled. The solids content is 78.5%. 160.0 parts of the resin, mixed with 2 parts of isodecanol, are protonized with 4.3 parts of acetic acid and then diluted to a solids content of about 12% with fully deionized water.

After stirring the mixture overnight at room temperature, steel sheet which has been iron-phosphatized and then washed with chromic acid (for example Bonder ® 1041 from Metallgesellschaft) is coated for 2 minutes at 200 volt, the bath having a pH of 7.85 and a conductivity of 1.98 s.cm$^{-1}$. After baking for 20 minutes at 180° C., smooth films about 11 μm thick are obtained; after corrosion testing for 720 hours in accordance with DIN 50,021, the specimens give corrosion values of 1–2 mm.

EXAMPLE 2

A total of 250.0 parts of a diglycidyl ether obtained from bisphenol A and epichlorohydrin, and having an epoxide value of 0.2, is added in portions of 25.0 parts at intervals of 5 minutes to a mixture of 270 parts of glycol, 50 parts of ethylglycol acetate and 0.5 part of boron trifluoride etherate at 100° C. The batch is stirred for 1 hour at 100° C. and is then distilled under reduced pressure from a waterpump until no more material passes over; during this distillation, the temperature rises to 170° C.

The batch is then diluted with 185.0 parts of toluene and a mixture of 180.0 parts of the semi-blocked toluylene diisocyanate referred to in Example 1 and 150.0 parts of a semi-blocked toluylene diisocyanate obtained from 2-ethylhexanol and an 80/20 toluylene diisocyanate isomer mixture is added in the course of 2 hours 15 minutes at 90° C. After completion of this addition, stirring is continued for 1 hour at 90° C., and the mixture is then heated to 120° C., kept at this temperature for 3.5 hours, and diluted after cooling with 81 parts of toluene. The solids content of the resulting polyether-polyol derivative containing blocked isocyanate groups, ie. of component A, is 71%.

300.0 parts of component A are reacted for 2 hours at 100° C. with 100.0 parts of a polyaminoimidazoline obtained from dimeric fatty acids and a polyamine and having an amine number of 370–410 (for example Versamid ® from Schering AG); the mixture is slightly cooled and then diluted with 45.0 parts of methyl ethyl ketone.

An electrocoating bath having a solids content of about 12% and a pH of 7.1 is prepared from 135.0 parts of the 66.7% strength cathodic electrocoating binder obtained above, 42.0 parts of a pigment paste described below, 1.9 parts of dibutyl-tin dilaurate and 2.5 parts of acetic acid, the mixture being diluted to 1,000 parts by volume, with parts by volume bearing the same relation to parts by weight as that of the liter to the kilogram, with fully deionized water. After the bath has been stirred for 48 hours at room temperature, 6 parts of isodecanol are added and after some time phosphatized steel panels (Bonder 1041 from Metallgesellschaft) are coated at 250 volt; after baking for 20 minutes at 180° C., smooth films about 15 μm thick are obtained, which exhibit good mechanical and corrosionprotective properties.

The pigment paste is prepared as follows: 333.0 parts of wetting agent II described in German Laid-Open Application DOS 2,606,831 are ground with 340.0 parts of talc, 166.0 parts of titanium dioxide, 100.0 parts of carbon black, 94.0 parts of butylglycol and 236.0 parts of iso-butanol on a triple-roll mill. The solids content of the pigment paste is 80%; the particle size is less than 4 μm.

EXAMPLE 3

A mixture of 250 parts of a diglycidyl ether obtained from bisphenol A and epichlorohydrin and having an epoxide value of 0.2, 60 parts of cardanol and 1.25 parts of diethanolamine is heated to 120° C. under nitrogen, and stirred at the same temperature for 8 hours. At that stage, the epoxide value is 0.038 and corresponds to about 0.24 mole of epoxide groups in the batch. To remove these residual epoxide groups, the batch is mixed with 9.0 parts of freshly distilled mercaptoethanol and reacted for 45 minutes at 120° C., after which it is diluted with 30.10 parts of toluene.

A mixture of 86.3 parts of the toluylene diisocyanate semi-blocked with ethylglycol, already referred to, and 103.5 parts of toluylene diisocyanate semiblocked with 2-ethylhexanol is then added dropwise to the batch in the course of one hour at 90° C., and stirring is then continued at the same temperature for 2 hours. After dilution with 70.0 parts of toluene, the solids content is 70.5%. This mixture constitutes component A.

200.0 parts of component A and 70.0 parts of a polyaminoimidazoline having an amine number of 370–410 (for example Versamid 140 from Schering AG) are reacted for 2 hours at 100° C. and then diluted with 30.0 parts of methyl ethyl ketone. The solids content is 70.5%.

A coating bath is prepared by diluting a mixture of 126.0 parts of the cathodic electrocoating resin, 10.0 parts of a $C_{12}$–$C_{14}$-monoalcohol, 2.0 parts of dibutyltin dilaurate, 2.2 parts of acetic acid and 103 parts of an aqueous pigment paste obtained as follows: 50.0 parts of the cathodic electrocoating resin are protonized with 1.3 parts of acetic acid, diluted with 180.0 parts of fully deionized water, mixed with 40.0 parts of talc, 18.0 parts of titanium dioxide and 8.1 parts of carbon black, and milled in a ball mill until the particle size is less than 4 μm.

The solids content is 10%, the pH is 7.2 and the conductivity is 1.15 s.cm$^{-1}$. The bath is stirred for about 40 hours at room temperature. It is then used to coat phosphatized steel sheet at 100 volt, giving films which after baking for 20 minutes at 180° C. are smooth, withstand flexing and afford corrosion-protection.

EXAMPLE 4

A mixture of 300.0 parts of a diglycidyl ether obtained from bisphenol A and epichlorohydrin and having an epoxide value of 0.1, 65 parts of linseed oil fatty acid, 2.5 parts of freshly distilled mercaptoethanol and 50 parts of toluene is stirred for 12.0 hours at 120° C. under nitrogen. At that stage, the epoxide value of the batch is 0.025. To remove residual epoxide groups, 6.0 parts of mercaptoethanol are added and after 30 minutes the batch is diluted with 82.0 parts of toluene.

125.0 parts of each of the two semi-blocked toluylene diisocyanates which constitute the mixture referred to in Example 3 are added dropwise in the course of 1 hour at 90° C. The batch is stirred for a further hour at 90° C., 136.0 parts of toluene and 0.5 part of dibutyl-tin dilaurate are then added, and stirring is continued for 5 hours at 90° C. At that stage, the NCO value is 0.28%. After dilution with a further 60 parts of toluene, the solids content of the resulting component A is 73%.

To prepare a cathodic electrocoating resin, 200.0 parts of component A are reacted for 2 hours at 100° C. with 70.0 parts of the polyaminoimidazoline used in Example 1 and the mixture is then diluted with 30.0 parts of methyl ethyl ketone. The solids content of the resin is 70.10%.

A coating bath is prepared from 164.0 parts of the resin, 2.8 parts of dibutyl-tin dilaurate, 12.0 parts of a $C_{12}$–$C_{14}$-monoalkanol, 3.0 parts of acetic acid and 149 parts of the pigment paste described below. The mixture is diluted to a solids content of 12% with fully deionized water (pH of the mixture 7.35; conductivity 0.98 s.cm$^{-1}$).

After having stirred the bath overnight at room temperature, 10 parts of isodecanol are added and stirred in. The bath is then used to coat iron-phosphatized, chromate-washed and heat-dried steel panels at 150 volt; after baking for 20 minutes at 180° C., smooth, flawless coatings, 16 μm thick, are obtained. These give a corrosion value (according to DIN 50,021) of less than 0.5 mm after 10 days, and have good mechanical properties.

EXAMPLE 5

200.0 parts of component A, prepared as described in Example 2, are reacted with 100.0 parts of component B, described below, in 22 parts of toluene for 2 hours at 100° C.

The mixture is then diluted with 30 parts of methyl ethyl ketone. The solids content of the cathodic electrocoating resin is 70.5%.

Component B is prepared as follows:

300.0 parts of diethylenetriamine (ie. a large excess) are heated to 70° C. and a solution of 350.0 parts of a glycidyl ether of phenol-modified cardanol, having an epoxide value of 0.184 (eg. Dobekot E4 from Beck of India) in 100.0 parts of toluene is then added dropwise in the course of one hour. The solvent and excess amine are then substantially removed by distillation under greatly reduced pressure. During the distillation, the temperature in the reaction vessel is allowed to rise slowly, and toward the end of the distillation reaches about 180° C.; this temperature is then maintained for 30 minutes. The somewhat dark, semi-solid product is used undiluted.

To prepare a coating bath, 126.0 parts of the cathodic electrocoating resin are mixed with 10.0 parts of a $C_{12}$–$C_{14}$-monoalkanol, 2.0 parts of dibutyl-tin dilaurate, 1.5 parts of acetic acid and 103.0 parts of an aqueous pigment paste prepared as follows: 50.0 parts of the cathodic binder, protonized with 1.3 parts of acetic acid, are diluted with 180.0 parts of fully deionized water, 34.0 parts of talc, 18.0 parts of titanium dioxide and 8.1 parts of carbon black are added and the batch is milled in a ball mill until the particle size is less than 4 μm. The resin used exhibits a particularly good wetting action during grinding; the ground paste has a particularly high pigment compatibility. The finished coating bath has a solids content of 10%, a pH of 6.75 and a conductivity of 1.04 s.cm$^{-1}$.

The bath is stirred for 24 hours, and 10 parts of isodecanol are then stirred in. Zinc-phosphatized, water-washed and air-dried steel sheet (Bonder 127 WL from Metallgesellschaft) is coated at 150 V and after baking for 20 minutes at 180° C. smooth coatings, about 18 μm thick, are obtained, which exhibit good mechanical and corrosion-protective properties. In tests according to DIN 50,021, the values obtained are less than 2 mm after 15 days.

EXAMPLE 6

To prepare a polyether-polyol, 500.0 parts of a diglycidyl ether obtained from bisphenol A and epichlorohydrin are added in portions each of 50.0 parts, at intervals of 5 minutes, to 540.0 parts of glycol, 100.0 parts of toluene and 1.0 part of boron trifluoride etherate at 100° C., and the batch is then stirred for a further hour. The volatile constituents are then substantially removed under reduced pressure from a waterpump, with the internal temperature of the batch reaching 170°–180° C. toward the end of the distillation. 370.0 parts of toluene are added, 300.0 parts of an 80/20 toluylene diisocyanate isomer mixture, semi-blocked with ethylglycol, are introduced dropwise in the course of 90 minutes at 90° C., and the batch is then stirred for 3 hours at 120° C. At that stage, the NCO content of component A is 0.20%, and the solids content after dilution with 161.0 parts of toluene is 71%.

To prepare a cathodic electrocoating binder, 200.0 parts of component A are reacted with 100.0 parts of the polyamine described below (component B) in 22.0 parts of toluene for 3 hours at 110° C., and the mixture is diluted with 30.0 parts of methyl ethyl ketone. The solids content of the resin is 72.5%.

To prepare the polyamine referred to above (component B), 375.0 parts of a diglycidyl ether obtained from bisphenol A and epichlorohydrin and having an epoxide value of 0.5, and 50.0 parts of toluene, are added dropwise to 412.0 parts of diethylenetriamine at 70° C.

The excess amine is removed by a method similar to that used for component B of Example 5.

To prepare an electrocoating bath, 143.0 parts of the cathodic electrocoating resin are protonized with 2.5 parts of acetic acid and diluted to 1,000 parts by volume, with parts by volume bearing the same relation to parts by weight as that of the liter to the kilogram, with fully deionized water; the bath has a pH of 7.7 at 30° C., and a conductivity of 1.4 s.cm$^{-1}$ at 30° C.

After stirring the bath overnight at room temperature, phosphate-coated steel sheet is electrocoated at 200 V for 2 minutes. After baking for 20 minutes at 180° C., very hard, smooth films about 13 μm thick are obtained.

EXAMPLE 7

511.0 parts of diethylene glycol dimethyl ether and 323.7 parts of epichlorohydrin are introduced into a 5 liter reactor; 1,064.0 parts of bisphenol A are added whilst stirring and are dissolved at 60° C.

336.0 parts of 50% strength sodium hydroxide solution are added dropwise in the course of 1 hour. Good cooling is necessary during this addition, since the reaction is highly exothermic.

During the addition of NaOH, the temperature is allowed to rise slowly to 80° C. When all has been added, the batch is reacted for a further hour at 100° C. 140.0 parts of ethylene oxide are then forced into the reactor under pressure whilst lowering the internal temperature to about 80° C., and 1 hour at 85°–90° C. is then allowed in order to complete the reaction. The batch is then neutralized with 50 ml of concentrated hydrochloric acid. After adding toluene, the water is removed azeotropically and the solution is filtered. The solids content is 55%.

A mixture of 257.5 parts of toluylene diisocyanate semi-blocked with ethylglycol, and 296.5 parts of toluylene diisocyanate semi-blocked with 2-ethylhexanol is added dropwise in the course of 1.5 hours to 950.0 parts of the above solution at 90° C., stirring is continued for 1 hour and the mixture is then diluted with 28.0 parts of toluene.

The solids content of the component A solution is 72.0%.

To prepare a cathodic electrocoating binder, 195.0 parts of the polyether-polyol derivative containing blocked isocyanate groups are mixed with 70.0 parts of a polyaminoamide obtained from dimeric fatty acids and amines and having an amine number of 300 (eg. Versamid 125 from Schering AG), and the mixture is reacted for 4 hours 15 minutes at 100° C. and is then diluted with 30.0 parts of methyl ethyl ketone. The solids content is 69.0%.

To prepare an electrocoating bath, 145.0 parts of the binder are protonized with 2.5 parts of acetic acid and diluted to 1,000 parts by volume, with parts by volume bearing the same relation to parts by weight as that of the liter to the kilogram, with fully deionized water; the bath has a pH of 6.6 and a conductivity of 0.6 s.cm$^{-1}$. After thoroughly stirring the bath overnight, phosphatized steel sheet is electrocoated for 2 minutes at 280 volt; after baking at 180° C. for 20 minutes, smooth coatings 10 μm thick are obtained.

We claim:

1. A process for the preparation of self-crosslinking, cathodic electrocoating binders by reacting polyether-polyols, which may or may not contain thio groups, with semi-blocked diisocyanates or partially blocked polyisocyanates, wherein the reaction products (A) so obtained and containing blocked isocyanate groups, are further reacted with a polyamine (B) in such a way that one or more amino groups of the polyamine (B) form a urea group with a blocked isocyanate group of the reaction product (A) and the self-crosslinking reaction product of (A) and (B) is thereafter converted into a water-dilutable form in the conventional manner by protonization with an acid.

2. A process as claimed in claim 1, wherein the reaction product (A), containing blocked isocyanate groups, is reacted with the polyamine (B) in the weight ratio of from 9:1 to 2.5:7.5.

3. A process as claimed in claim 1, wherein the primary and/or secondary amino groups and/or ketimine groups contained in the self-crosslinking reaction product of (A) and (B) give amine numbers of from 20 to 200.

4. A process as claimed in claim 1, wherein the polyether-polyol used to prepare the reaction product (A) is an epoxide-free reaction product obtained from glycidyl ethers of diphenols or polyphenols and a compound of the formula HXR, where X is O, S, [—O—CH$_2$—CH$_2$—]$_n$ or

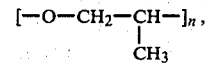

n is an integer from 1 to 3 and R is alkyl of 1 to 12 carbon atoms or is —CH$_2$—CH$_2$—OH or

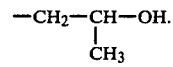

5. A process as claimed in claim 1, wherein the polyether-polyol used to prepare the reaction product (A) is a reaction product obtained from a diphenol or polyphenol, containing ether groups, with a monoepoxide compound.

6. A process as claimed in claim 1, wherein the polyether-polyol used to prepare the reaction product (A) is an epoxide-free reaction product obtained from one or more glycidyl ethers of a diphenol or polyphenol and the monohydric phenol fraction of cashew nut shell liquid, said phenol having a 15-carbon unsaturated, meta-substituted group.

7. A process as claimed in claim 1, wherein an epoxide-free reaction product obtained from glycidyl ethers of polyhydric aliphatic alcohols, polyether-alcohols or epoxidized polybutadiene oils and a compound of the formula HXR, where X is O, S, [—O—CH$_2$—CH$_2$—]$_n$ or

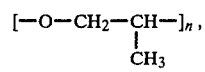

n is an integer from 1 to 3 and R is alkyl of 1 to 12 carbon atoms or is —CH$_2$—CH$_2$—OH or

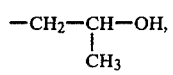

is used to prepare the reaction product (A), and a reaction product, obtained from a diglycidyl ether, based on a polyhydric phenol, and a polyfunctional amine is used as the polyamine (B).

8. A process as claimed in claim 1, wherein the polyether-polyol used to prepare the reaction product (A) is a reaction product obtained from a trihydric, tetrahydric, pentahydric or hexahydric alcohol and ethylene oxide or propylene oxide.

9. A process as claimed in claim 1, wherein a toluylene diisocyanate semi-blocked with a primary, secondary or tertiary alcohol is used to prepare the reaction product (A).

10. A process as claimed in claim 1, wherein a diisocyanate or polyisocyanate partially blocked with an alkylene glycol monoalkyl ether containing from 1 to 3 alkylene groups is used to prepare the reaction product (A).

11. A process as claimed in claim 1, wherein a partially blocked diisocyanate or polyisocyanate, whose blocking agent in part consists of a phenol, phthalimide, imidazole or a ketoxime, is used to prepare the reaction product (A).

12. A process as claimed in claim 1, wherein the reaction product (A) is a polyether-polyol which is partially esterified with unsaturated fatty acids and which contains blocked isocyanate groups and may or may not contain thio groups, and that during the reaction with the polyamine (B) the fatty acid radical of the said product (A) is at least partially transferred, with aminolysis and amide formation, onto the polyamine (B) or onto the polyamine portion of the reaction product of (A) and (B).

13. A process as claimed in claim 1, wherein the polyamine (B) is a reaction product of a polyfunctional amine with the glycidyl ether of the monohydric phenol fraction of cashew nut shell liquid, said phenol having a 15-carbon unsaturated, meta-substituted group, or the diglycidyl ether of a phenol adduct of the monohydric phenol fraction of cashew nut shell liquid, said phenol having a 15-carbon unsaturated, meta-substituted group.

14. A process as claimed in claim 1, wherein the polyamine (B) contains from 4 to 15 primary or secondary amino groups.

15. A process as claimed in claim 1, wherein the polyamine (B) contains olefinically unsaturated groups and has a molecular weight of from about 100 to 5,000.

16. A cathodic electrocoating binder prepared by the process as claimed in claim 1.

17. A cathodic electrocoating binder prepared by the process as claimed in claim 2.

18. A cathodic electrocoating binder prepared by the process as claimed in claim 3.

19. A cathodic electrocoating binder prepared by the process as claimed in claim 4.

20. A process as claimed in claim 1, wherein the primary amino groups of the polyamine (B) are in the form of ketimine groups.

21. A process as claimed in claim 1, wherein the blocking agents of product (A) are reacted with an epoxide compound after the reaction of the product (A) with the polyamine (B), and wherein the primary amino groups of the polyamine (B) are in the form of ketimine groups.

* * * * *